US012293710B2

(12) United States Patent
Jin

(10) Patent No.: US 12,293,710 B2
(45) Date of Patent: May 6, 2025

(54) PIXEL CIRCUIT AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Shuang Jin, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,171

(22) PCT Filed: Jun. 7, 2022

(86) PCT No.: PCT/CN2022/097347
§ 371 (c)(1),
(2) Date: Nov. 30, 2023

(87) PCT Pub. No.: WO2023/226082
PCT Pub. Date: Nov. 30, 2023

(65) Prior Publication Data

US 2024/0221639 A1 Jul. 4, 2024

(30) Foreign Application Priority Data

May 23, 2022 (CN) ......................... 202210564237.7

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01);
(Continued)

(58) Field of Classification Search
CPC ......... G09G 3/3233; G09G 2300/0819; G09G 2300/0852; G09G 2310/08; G09G 2320/0233; G09G 2320/045
See application file for complete search history.

(56) References Cited

U.S. PATENT DOCUMENTS

2009/0009441 A1* 1/2009 Yamamoto ........... G09G 3/3233 345/80
2011/0273419 A1 11/2011 Park et al.
(Continued)

FOREIGN PATENT DOCUMENTS

CN 101339735 A 1/2009
CN 101650916 A 2/2010
(Continued)

OTHER PUBLICATIONS

International Search Report in International application No. PCT/CN2022/097347,mailed on Dec. 27, 2022.
(Continued)

*Primary Examiner* — Kenneth B Lee, Jr.

(57) ABSTRACT

The present disclosure discloses a pixel circuit and a display panel. The pixel circuit includes a driving transistor, a storage capacitor, a first transistor, and a second transistor. By configuring the first transistor as a dual-gate dual-channel type thin film transistor, so that when a source of the driving transistor is compensated through the first transistor and the storage capacitor by a data signal, a source potential of the driving transistor may be quickly increased to a preset potential in a short time.

14 Claims, 8 Drawing Sheets

(52) U.S. Cl.
CPC . *G09G 2300/0852* (2013.01); *G09G 2310/08* (2013.01); *G09G 2320/0233* (2013.01); *G09G 2320/045* (2013.01)

(56) References Cited

U.S. PATENT DOCUMENTS

| | | | | |
|---|---|---|---|---|
| 2012/0182281 | A1* | 7/2012 | Yamamoto | H10K 59/1213 345/211 |
| 2016/0300526 | A1* | 10/2016 | Lim | G09G 3/3233 |

FOREIGN PATENT DOCUMENTS

| | | | |
|---|---|---|---|
| CN | 102005182 | A | 4/2011 |
| CN | 102436793 | A | 5/2012 |
| CN | 102890910 | A | 1/2013 |
| CN | 104732927 | A | 6/2015 |
| CN | 105825815 | A | 8/2016 |
| CN | 212485338 | U | 2/2021 |
| CN | 112837651 | A | 5/2021 |
| WO | 2022030199 | A1 | 2/2022 |

OTHER PUBLICATIONS

Written Opinion of the International Search Authority in International application No. PCT/CN2022/097347,mailed on Dec. 27, 2022.
Chinese Office Action issued in corresponding Chinese Patent Application No. 202210564237.7 dated Dec. 2, 2022, pp. 1-8.

* cited by examiner

PIXEL CIRCUIT AND DISPLAY PANEL

TECHNICAL FIELD

The present disclosure relates to a display technology field, and in particular, to a pixel circuit and a display panel.

BACKGROUND

An active light emitting type display panel has prominent characteristics such as high brightness, high efficiency, and wide color gamut, and thus has a good application prospect in a display field. As a size of the display panel increases and/or a refresh frequency increases, a time for a pixel circuit in the display panel to operate in each frame is shortened, and a compensation time for a threshold voltage of a driving transistor in the pixel circuit is shortened. Therefore, in a shorter time, it is difficult to compensate a source potential of the driving transistor to a preset potential, which affects a compensation effect.

Technical Problems

The present disclosure provides a pixel circuit and a display panel to alleviate a technical problem that a time for compensating the source potential of the driving transistor in each frame is too shorter to be difficult for the source potential to reach a preset potential.

Technical Solutions

According to a first aspect, the present disclosure provides a pixel circuit including a driving transistor, a storage capacitor, a first transistor, a second transistor, and a light emitting device. A drain of the driving transistor is electrically connected to a positive power supply line. One terminal of the storage capacitor is electrically connected to a first gate of the driving transistor, and the other terminal of the storage capacitor is electrically connected to a source of the driving transistor. A first electrode of the first transistor is electrically connected to the one terminal of the storage capacitor, a first gate of the first transistor is electrically connected to a second gate of the first transistor and a scan line, a source of the first transistor is electrically connected to a data line, and the first transistor is a dual-channel type thin film transistor. A first electrode of the second transistor is electrically connected to a source of the driving transistor, a first gate of the second transistor is electrically connected to an initial control line, and a second electrode of the second transistor is electrically connected to an initial voltage line. An anode of the light emitting device is electrically connected to the source of the driving transistor, and a cathode of the light emitting device is electrically connected to a negative power supply line.

In some implementation, a second gate of the second transistor is electrically connected to the first gate of the second transistor, and the second transistor is a dual-channel type thin film transistor.

In some implementation, a second gate of the driving transistor is electrically connected to the first gate of the driving transistor, and the driving transistor is a dual-channel type thin film transistor.

In some implementation, the pixel circuit further includes: a third transistor, a first capacitor and the light emitting device. A first electrode of the third transistor is electrically connected to the positive power supply line, a first gate of the third transistor is electrically connected to a second gate of the third transistor and a light emitting control line, a second electrode of the third transistor is electrically connected to the drain of the driving transistor, and the third transistor is a dual-channel type thin film transistor. One terminal of the first capacitor is electrically connected to the source of the driving transistor, and the other terminal of the first capacitor is electrically connected to the first electrode of the third transistor.

In some implementation, in an initialization stage of the pixel circuit, the first transistor and the second transistor are both in a turn-on state, a data signal has a first potential and a second potential, the first potential is smaller than the second potential, and a potential of the data signal is the first potential in the initialization stage.

In some implementation, in a compensation stage of the pixel circuit, the first transistor is in the turn-on state and the second transistor is in a turn-off state, and the potential of the data signal is the first potential in the compensation stage.

In some implementation, in a writing stage of the pixel circuit, the first transistor is in the turn-on state, the second transistor, the third transistor, and the driving transistor are in the turn-off state, and the potential of the data signal is the second potential in the writing stage.

In some implementation, in a light emitting stage of the pixel circuit, the third transistor and the driving transistor are both in the turn-on state, and the first transistor and the second transistor are both in the turn-off state.

In some implementation, a duration of a compensation stage is greater than a duration of the initialization stage or a duration of the writing stage.

In some implementation, a channel material of the dual-channel type thin film transistor at least includes a metal oxide.

According to a second aspect, the present disclosure provides a display panel including a pixel circuit according to at least one of the implementations described above, and at least one of pixel circuit arrays is distributed in a display area of the display panel.

Beneficial Effects

In a pixel circuit and a display panel according to the present disclosure, the mobility of the first transistor is improved by configuring the first transistor as a dual-gate dual-channel type thin film transistor, so that when the source of the driving transistor is compensated through the first transistor and the storage capacitor by the data signal, the source potential of the driving transistor may be increased to the preset potential as quickly as possible in as short a time as possible.

In addition, by configuring the second transistor as a dual-gate dual-channel type thin film transistor, the mobility of the second transistor is improved and the initialization time required by the pixel circuit is shorten. The saved initialization time may be taken to compensate the source potential of the driving transistor, to increase the time for compensating the source of the driving transistor. It may further ensure that the source potential of the driving transistor may be increased to the preset potential in the compensation process.

DESCRIPTION OF SPECIFIC EMBODIMENTS OF THE INVENTION

In order to make the objects, technical solutions and effects of the present disclosure clearer, the present disclosure is further described in detail below with reference to the accompanying drawings and illustrations. It should be understood that specific embodiments described herein are merely intended to explain the present disclosure and are not intended to limit the present disclosure.

Figure 1:
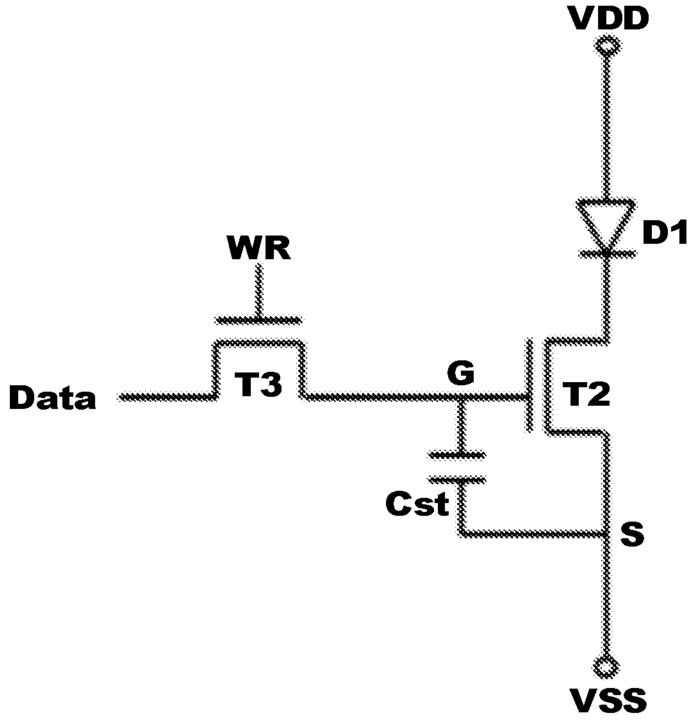
FIG. 1 is a schematic structural view of a pixel circuit in the related art.

A pixel circuit as shown in FIG. 1 is a 2T1C structure and includes a light emitting device D1, a storage capacitor Cst, a first transistor T3, and a driving transistor T2. An anode of the light emitting device D1 is connected to a power supply positive signal VDD. A cathode of the light emitting device D1 is electrically connected to a drain of the driving transistor T2. A source of the driving transistor T2 is electrically connected to one terminal of the storage capacitor Cst and connected to a power supply negative signal VSS. A gate of the driving transistor T2 is electrically connected to the other terminal of the storage capacitor Cst and a first electrode of the first transistor T3. A gate of the first transistor T3 is connected to a signal WR. A second electrode of the first transistor T3 is connected to a data signal Data.

A light emitting current flowing through the light emitting device D1 in the above pixel circuit is $ILED=\frac{1}{2}K(V_{GS}-Vth)^2$, wherein K is a constant, $V_{GS}$ is a difference value between VG and VS, VG is a gate potential of the driving transistor T2, VS is a source potential of the driving transistor T2, and Vth is a threshold voltage of the driving transistor T2. However, due to the limitation of the manufacturing process, there is a difference in the initial threshold voltage between respective pixel circuits of the entire display panel, and the threshold voltage of the driving transistor tends to deviate under a long-time heating and pressurizing condition, thereby affecting a current passing through the light emitting device D1 and causing poor uniformity of the display panel. In order to solve the problem of different threshold voltages, an external compensation scheme and an internal compensation scheme are proposed. The internal compensation is widely used because of the advantages of real-time compensation.

Figure 2:
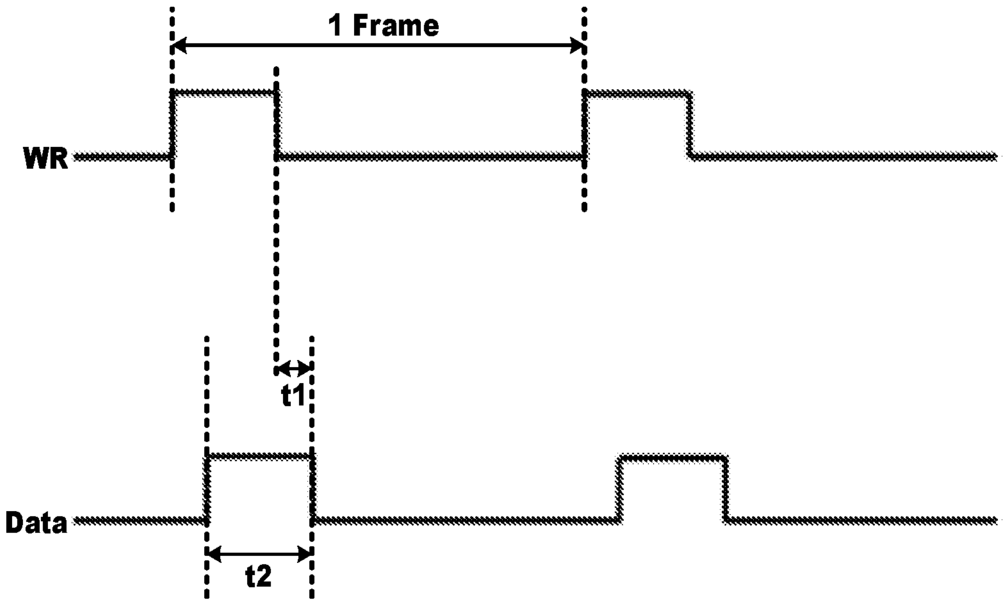
FIG. 2 is a timing diagram of the pixel circuit shown in FIG. 1.

FIG. 2 shows that a timing schematic diagram of the pixel circuit in FIG. 1. In a frame, a time difference between a rising edge of the signal WR and a rising edge of the data signal Data is t1, a time difference between a falling edge of the signal WR and a falling edge of the data signal Data is t1, and a pulse duration of the data signal Data is t2=1/f/row, where row is the number of lines of the pixel circuits or pixels in the display panel, and f is the refresh frequency of the display panel.

It can be understood that as the size (number of lines) of the display panel increases or the refresh frequency f increases, the pulse duration t2 of the data signal Data may be reduced. In order to ensure a charging time of the data signal Data, the compensation time of the pixel circuit will be compressed, so that it is difficult for the source of the driving transistor T2 to be charged up to a preset potential in a shorter time, which will affect a compensable drift range of the threshold voltage of the driving transistor T2.

In view of this, the present embodiment provides a pixel circuit. With reference to FIGS. 3-8, the pixel circuit includes a driving transistor T2, a storage capacitor Cst, a first transistor T3, and a second transistor T1. A drain of the driving transistor T2 is electrically connected to a positive power supply line. One terminal of the storage capacitor Cst is electrically connected to a first gate of the driving transistor T2, and the other terminal of the storage capacitor Cst is electrically connected to a source of the driving transistor T2. A first electrode of the first transistor T3 is electrically connected to the one terminal of the storage capacitor Cst. A first gate of the first transistor T3 is electrically connected to a second gate and a scan line of the first transistor T3. A second electrode of the first transistor T3 is electrically connected to a data line. The first transistor T3 is a dual-channel type thin film transistor. A first electrode of the second transistor T1 is electrically connected to a source of the driving transistor T2. A first gate of the second transistor T1 is electrically connected to an initial control line. A second electrode of the second transistor T1 is electrically connected to an initial voltage line. An anode of the light emitting device D1 is electrically connected to the source of the driving transistor T2, and a cathode of the light emitting device D1 is electrically connected to a negative power supply line.

It may be understood that in the pixel circuit provided in the present embodiment, by configuring the first transistor T3 as a dual-gate dual-channel type thin film transistor, the mobility of the first transistor T3 is increased, so that when the source of the driving transistor T2 is compensated through the first transistor T3 and the storage capacitor Cst by the data signal Data, the source potential of the driving transistor T2 may be increased to the preset potential as quickly as possible in as short a time as possible.

The scan line is configured to transmit a scan signal SCAN. The data line is configured to transmit the data signal Data. The initial control line is configured to transmit an initial control signal Init. The initial voltage line is configured to transmit an initial voltage signal Vini. The positive power supply line is configured to transmit a positive power supply signal VDD. The negative power supply line is configured to transmit a power supply negative signal VSS.

It should be noted that the first electrode may be one of the source/drain and the second electrode may be the other of the source/drain.

In one embodiment, a second gate of the second transistor T1 is electrically connected to the first gate of the second transistor T1, and the second transistor T1 is a dual-channel type thin film transistor.

It may be understood that in the pixel circuit provided in the present embodiment, by configuring the second transistor T1 as a dual-gate dual-channel type thin film transistor, the mobility of the second transistor T1 is improved and the initialization time required by the pixel circuit is shorten. The saved initialization time may be taken to compensate the source potential of the driving transistor T2, to increase the time for compensating the source of the driving transistor T2. It may further ensure that the source potential of the driving transistor T2 may be increased to the preset potential in the compensation process.

In one embodiment, the second gate of the driving transistor T2 is electrically connected to the first gate of the driving transistor T2, and the driving transistor T2 is a dual-gate dual-channel type thin film transistor.

It can be understood that, in the present embodiment, the driving transistor T2 is configured as a dual-gate dual-channel type thin film transistor, so that the mobility of the driving transistor T2 may be improved, and the dynamic performance of the pixel circuit may be further improved.

In one embodiment, the pixel circuit further includes a third transistor T4 and a first capacitor C1. A first electrode of the third transistor T4 is electrically connected to the positive power supply line. A first gate of the third transistor T4 is electrically connected to a second gate of the third transistor T4 and a light emitting control line. A second electrode of the third transistor T4 is electrically connected to the drain of the driving transistor T2. The third transistor T4 is a dual-channel type thin film transistor. One terminal of the first capacitor C1 is electrically connected to the source of the driving transistor T2. The other terminal of the first capacitor C1 is electrically connected to the first electrode of the third transistor T4.

The light emitting control line is configured to transmit a light emitting control line EM1.

It may be understood that, in the present embodiment, the third transistor T4 is configured as a dual-gate dual-channel type thin film transistor, so that the mobility of the third transistor T4 may be improved, and the dynamic performance of the pixel circuit may be further improved. Therefore, a current flow channel between the power supply positive signal VDD and the power supply negative signal VSS is more efficient.

In one embodiment, a duration of a compensation stage S12 is greater than a duration of an initialization stage S11 or a duration of a writing stage S13.

In one embodiment, a channel material of the dual-channel type thin film transistor at least includes a metal oxide. That is, the above-described dual-channel type thin film transistor may also be a metal oxide thin film transistor or, further, be an indium gallium zinc oxide thin film transistor.

It should be noted that the metal oxide thin film transistor has a better turn-off performance, and the leakage phenomenon of the gate of the driving transistor T2 can be reduced or prevented.

At least one of the first transistor T3, the second transistor T1, the third transistor T4, and the driving transistor T2 may be, but is not limited to, an N-channel type thin film transistor, or may also be a P-channel type thin film transistor.

The light emitting device D1 may be any of a mini light emitting diode, a micro light emitting diode, an organic light emitting diode, and a quantum dot light emitting diode.

Figure 3:
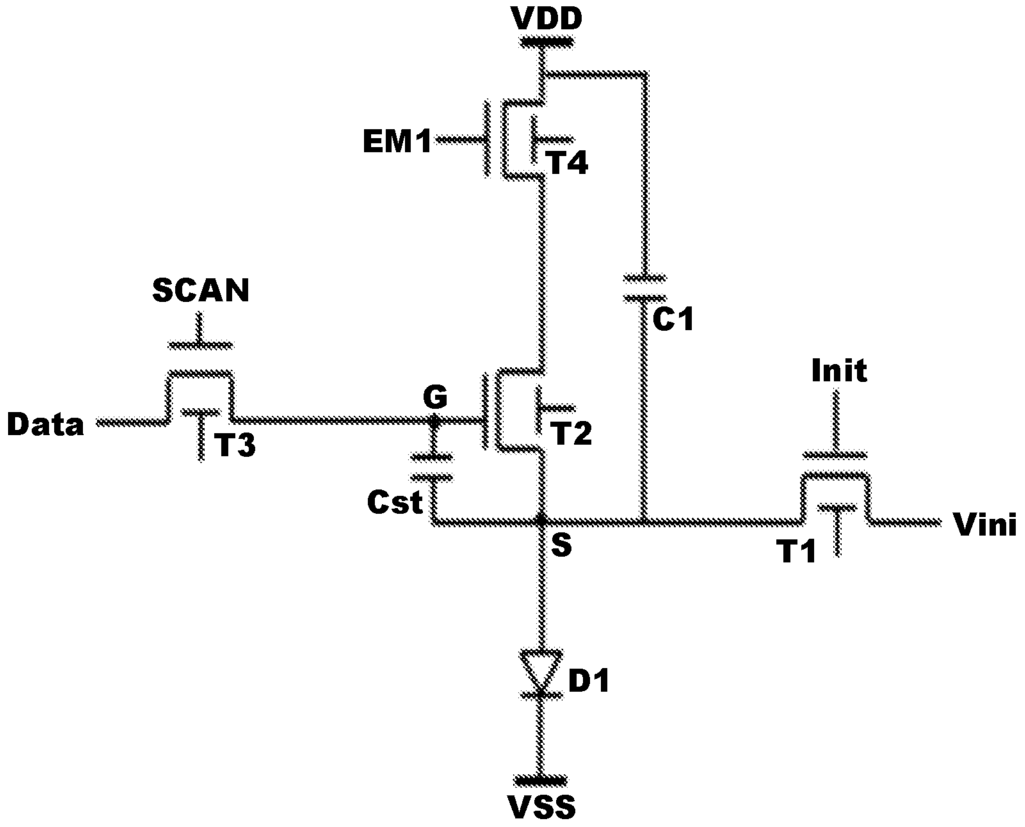
FIG. 3 is a schematic structural view of a pixel circuit according to an embodiment of the present disclosure.
Figure 4:
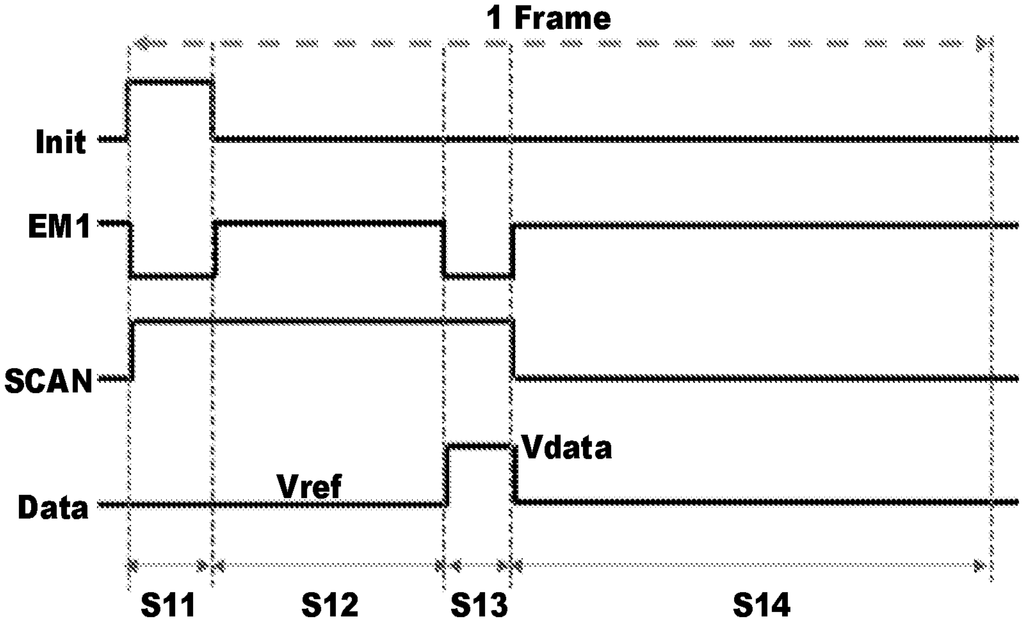
FIG. 4 is a timing diagram of the pixel circuit shown in FIG. 3.
Figure 5:
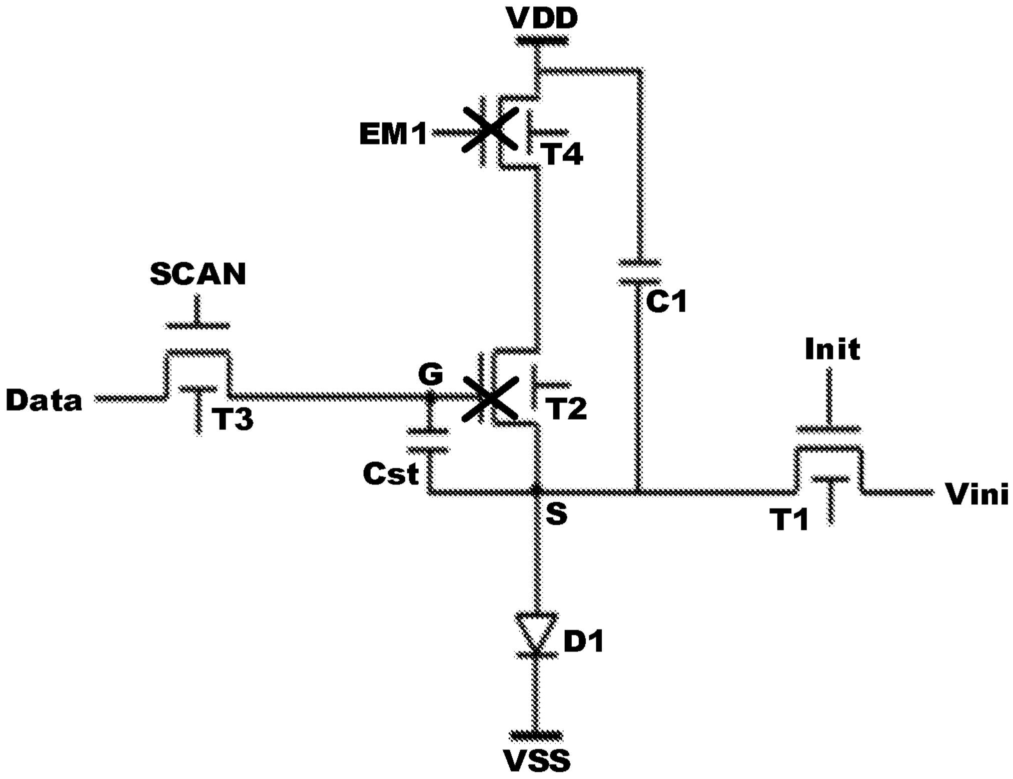
FIG. 5 is a schematic diagram of a state in which the pixel circuit shown in FIG. 3 operates in an initialization stage.

The operation of the pixel circuit shown in FIG. 3 in one frame (1 Frame) is shown in FIG. 4, and includes the following stages:

the initialization stage S11: as shown in FIGS. 4 and 5, the initial control signal Init and the scan signal SCAN are both at a high potential, and the second transistor T1 and the first transistor T3 are in a turn-on state. The light emitting control signal EM1 and the data signal Data are at a first potential Vref, and the third transistor T4 and the driving transistor T2 are in a turn-off state. The gate potential of the driving transistor T2 is reset through the first transistor T3 by the first potential Vref of the data signal Data. Meanwhile, the source potential of the driving transistor T2 is reset through the second transistor T1 by the initial voltage signal Vini.

Figure 6:
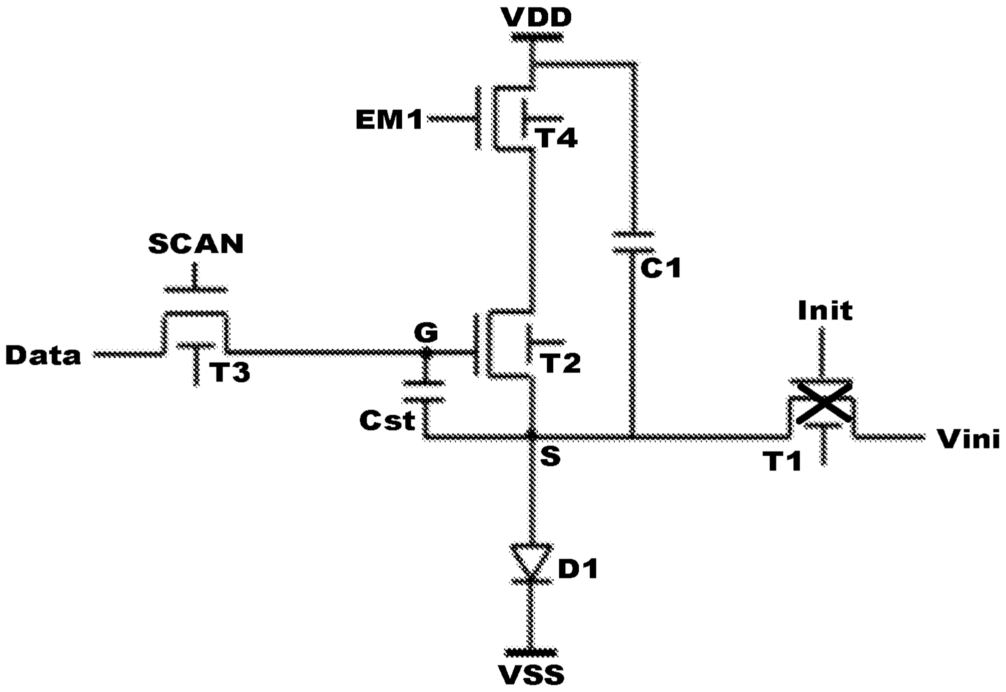
FIG. 6 is a schematic diagram of a state in which the pixel circuit shown in FIG. 3 operates in a compensation stage.
Figure 7:
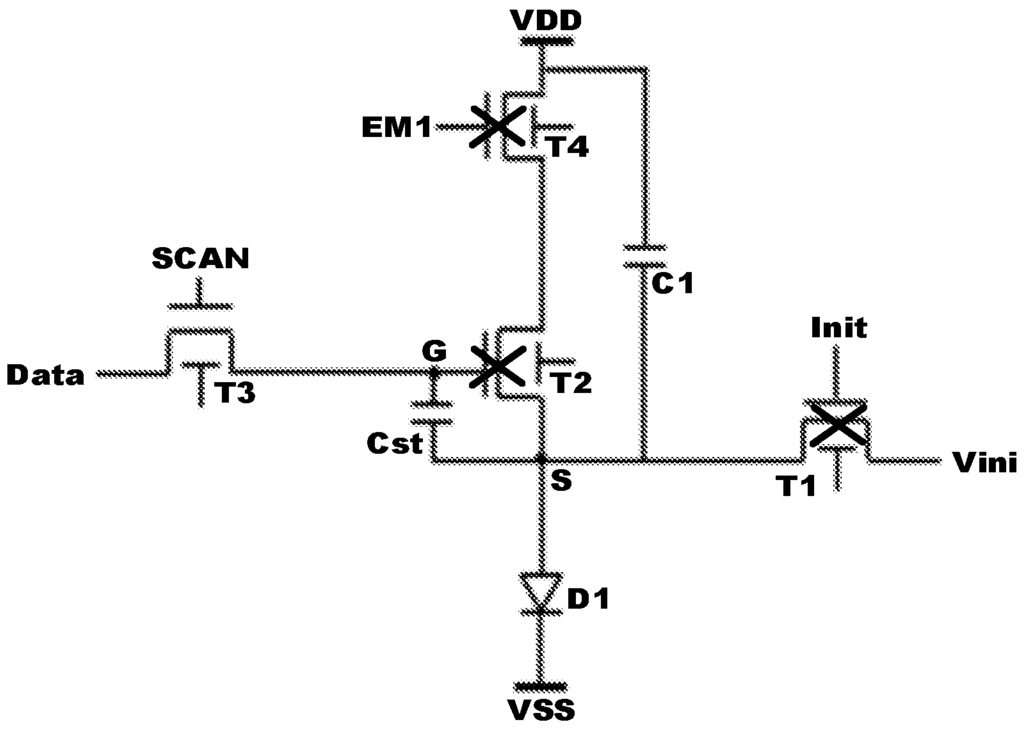
FIG. 7 is a schematic diagram of a state in which the pixel circuit shown in FIG. 3 operates in a writing stage.

The compensation stage S12: as shown in FIGS. 4 and 6, the light emitting control signal EM1 and the scan signal SCAN are both at the high potential, and the third transistor T4, the first transistor T3, and the driving transistor T2 are in the turn-on state. The initial control signal Init and the data signal Data are at the first potential Vref, and the second transistor T1 are in the turn-off state. The gate potential of the driving transistor T2 is charged up to the preset potential, i.e. (Vref−Vth), through the first transistor T3 by the first potential Vref of the data signal Data The writing stage S13: as shown in FIGS. 4 and 7, the scan signal SCAN and the data signal Data are both at the high potential, and the first transistor T3 are in the turn-on state. The light emitting control signal EM1 and the initial control signal Init are both at a low potential, and second transistor T1, the third transistor T4, and the driving transistor T2 are all in the turn-off state. The gate of the driving transistor T2 is charged through the first transistor T3 by a second potential Vdata of the data signal Data.

Figure 8:
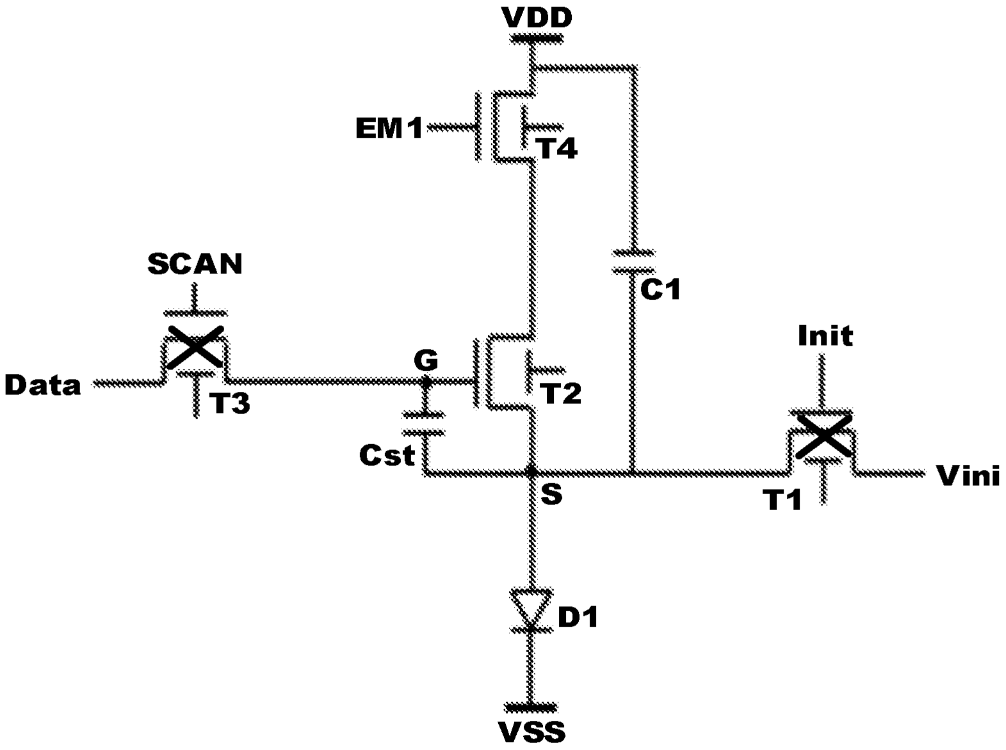
FIG. 8 is a schematic diagram of a state in which the pixel circuit shown in FIG. 3 operates in a light emitting stage.

The light emitting stage S14: as shown in FIGS. 4 and 8, the light emitting control signal EM1 is at the high potential, and the third transistor T4 and the driving transistor T2 are in a turn-on state. The scan signal SCAN, the data signal data, and the initial control signal Init are all at the low potential, and the first transistor T3 and the second transistor T1 are both in a turn-off state. The light emitting device D1 starts to emit light, and the light emitting current ILED flowing through the light emitting device D1 is as follows:

$$ILED = 1/2K(V_{GS} - Vth)^2 = 1/2K[(Vdata - Vref) \times C1/(C1 + Cst)]^2$$

The potentials of the key times in the above stages are shown in the following table:

| | VG | VS | $V_{GS}$ |
|---|---|---|---|
| Initialization Stage S11 | Vref | Vini | Vref − Vini |
| Compensation Stage S12 | Vref | Vref − Vth | Vth |
| Writing Stage S13 | Vdata | (Vref − Vth) + (Vdata − Vref) × Cst/(C1 + Cst) | (Vdata − Vref) × C1/(C1 + Cst) + Vth |
| Light Emitting Stage S14 | ~ | ~ | (Vdata − Vref) × C1/(C1 + Cst) + Vth |

Where VG indicates a potential at a node G, that is, the gate of the driving transistor T2, VS indicates a potential at a node S, i.e., the source of the driving transistor T2, $V_{GS}$ indicates a voltage difference between the node G and the node S, Vref indicates the first potential of the data signal Data, Vdata indicates the high potential or the second potential of the data signal Data, Vini is characterized herein as a potential of the initial voltage signal Vini, Vth is the threshold voltage of the driving transistor T2, Cst is characterized herein as a capacitance value of the storage capacitor Cst, and C1 is characterized herein as a capacitance value of the first capacitor C1.

Since the change of the potential VS at the node S in the writing stage S13 is caused by the potential VG at the node G through a coupling action between the storage capacitor Cst and the first capacitor C1, the potential VS at the node S in the writing stage S13 is the sum of the potential VS at the node S in the compensating stage S12 and the potential change amount, that is, (Vdata−Vref)×Cst/(C1+Cst), at the node S in the writing stage S13.

In one of the embodiments, the present embodiment provides a display panel, which includes the pixel circuit in at least one of the above-mentioned embodiments, and at least one of pixel circuit arrays is distributed in a display area of the display panel.

It may be understood that, in the display panel according to the present embodiment, the mobility of the first transistor T3 is improved by configuring the first transistor T3 as a dual-gate dual-channel type thin film transistor, so that when the source of the driving transistor T2 is compensated through the first transistor T3 and the storage capacitor Cst by the data signal Data, the source potential of the driving transistor T2 may be increased to the preset potential as quickly as possible in as short a time as possible.

Meanwhile, by configuring the second transistor T1 as a dual-gate dual-channel type thin film transistor, the mobility of the second transistor T1 is improved and the initialization time required by the pixel circuit is shorten. The saved initialization time may be taken to compensate the source potential of the driving transistor T2, to increase the time for compensating the source of the driving transistor T2. It may further ensure that the source potential of the driving transistor T2 may be increased to the preset potential in the compensation process.

Based on an inventive concept of the present disclosure, the above-mentioned pixel circuit may be applied to a display panel with a large size and/or a high refresh frequency. Each transistor in the pixel circuit has a dual-gate dual-active layer structure, which may improve the mobility of the transistor. Thus, it is ensured that the pixel circuit of an internal compensation type may still operate normally with the large size and/or the high refresh frequency. Meanwhile, it may also reduce a threshold voltage difference between the driving transistors T2 in respective pixel circuits, and improve the consistency of the display image.

It may be understood that for those of ordinary skill in the art, equivalent replacements or changes may be made according to technical solutions and inventive concepts of the present disclosure, and all these changes or replacements should belong to the protection scope of the appended claims of the present disclosure.

What is claimed is:

1. A pixel circuit comprising:

a driving transistor, wherein a drain of the driving transistor is electrically connected to a positive power supply line;

a storage capacitor, wherein one terminal of the storage capacitor is electrically connected to a first gate of the driving transistor, and the other terminal of the storage capacitor is electrically connected to a source of the driving transistor;

a first transistor, wherein a first electrode of the first transistor is electrically connected to the one terminal of the storage capacitor, a first gate of the first transistor is electrically connected to a second gate of the first transistor and a scan line, a source of the first transistor is electrically connected to a data line, and the first transistor is a dual-channel type thin film transistor;

a second transistor, wherein a first electrode of the second transistor is electrically connected to a source of the driving transistor, a first gate of the second transistor is electrically connected to an initial control line, and a second electrode of the second transistor is electrically connected to an initial voltage line; and a light emitting device, wherein an anode of the light emitting device is electrically connected to the source of the driving transistor, and a cathode of the light emitting device is electrically connected to a negative power supply line;

a third transistor, wherein a first electrode of the third transistor is electrically connected to the positive power supply line, a first gate of the third transistor is electrically connected to a second gate of the third transistor and a light emitting control line, a second electrode of the third transistor is electrically connected to the drain of the driving transistor, and the third transistor is the dual-channel type thin film transistor; and a first capacitor, wherein one terminal of the first capacitor is electrically connected to the source of the driving transistor, and the other terminal of the first capacitor is electrically connected to the first electrode of the third transistor, wherein a second gate of the second transistor is electrically connected to the first gate of the second transistor, and the second transistor is the dual-channel type thin film transistor, and wherein a second gate of the driving transistor is electrically connected to the first gate of the driving transistor, and the driving transistor is the dual-channel type thin film transistor.

2. The pixel circuit according to claim 1, wherein in an initialization stage of the pixel circuit, the first transistor and the second transistor are both in a turn-on state, a data signal has a first potential and a second potential, the first potential is smaller than the second potential, and a potential of the data signal is the first potential in the initialization stage.

3. The pixel circuit according to claim 2, wherein in a compensation stage of the pixel circuit, the first transistor is in the turn-on state and the second transistor is in a turn-off state, and the potential of the data signal is the first potential in the compensation stage.

4. The pixel circuit according to claim 3, wherein in a writing stage of the pixel circuit, the first transistor is in the turn-on state, the second transistor, the third transistor, and the driving transistor are in the turn-off state, and the potential of the data signal is the second potential in the writing stage.

5. The pixel circuit according to claim 4, wherein in a light emitting stage of the pixel circuit, the third transistor and the driving transistor are both in the turn-on state, and the first transistor and the second transistor are both in the turn-off state.

6. The pixel circuit according to claim 5, wherein a duration of a compensation stage is greater than a duration of the initialization stage or a duration of the writing stage.

7. The pixel circuit according to claim 1, wherein a channel material of the dual-channel type thin film transistor at least comprises a metal oxide.

8. A display panel comprising the pixel circuit according to claim 1, wherein at least one of pixel circuit arrays is distributed in a display area of the display panel.

9. The display panel according to claim 8, wherein in an initialization stage of the pixel circuit, the first transistor and the second transistor are both in a turn-on state, a data signal has a first potential and a second potential, the first potential is smaller than the second potential, and a potential of the data signal is the first potential in the initialization stage.

10. The display panel according to claim 9, wherein in a compensation stage of the pixel circuit, the first transistor is in the turn-on state and the second transistor is in a turn-off state, and the potential of the data signal is the first potential in the compensation stage.

11. The display panel according to claim 10, wherein in a writing stage of the pixel circuit, the first transistor is in the turn-on state, the second transistor, the third transistor, and the driving transistor are in the turn-off state, and the potential of the data signal is the second potential in the writing stage.

12. The display panel according to claim 11, wherein in a light emitting stage of the pixel circuit, the third transistor and the driving transistor are both in the turn-on state, and the first transistor and the second transistor are both in the turn-off state.

13. The display panel according to claim 12, wherein a duration of a compensation stage is greater than a duration of the initialization stage or a duration of the writing stage.

14. The display panel according to claim 8, wherein a channel material of the dual-channel type thin film transistor at least comprises a metal oxide.

* * * * *